April 12, 1955 J. C. MACY Re. 23,980

SLIDE FASTENERS

Original Filed Sept. 5, 1947 3 Sheets-Sheet 1

INVENTOR
JAMES C. MACY.
BY
Curtis Morris & Safford
his ATTORNEYS

SLIDE FASTENERS
Original Filed Sept. 5, 1947 3 Sheets-Sheet 2
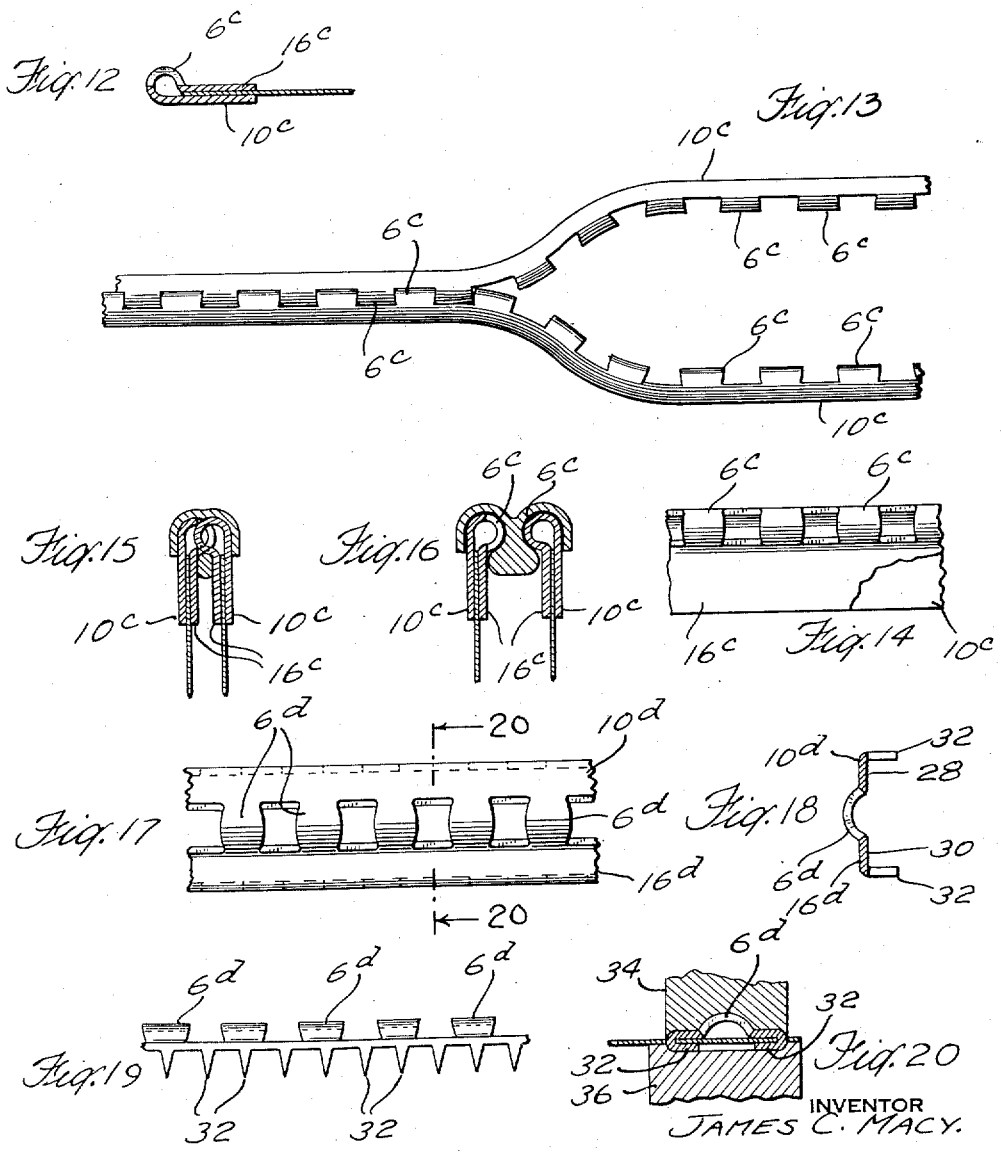
INVENTOR
JAMES C. MACY.
BY
Curtis Morris & Safford
ATTORNEYS

SLIDE FASTENERS

Original Filed Sept. 5, 1947 3 Sheets-Sheet 3

INVENTOR
JAMES C. MACY.
BY
Curtis Morris & Safford
ATTORNEYS

United States Patent Office

Re. 23,980
Reissued Apr. 12, 1955

23,980

SLIDE FASTENERS

James C. Macy, Westfield, N. J., assignor to Ideco, Incorporated, Westfield, N. J., a corporation of New Jersey Original No. 2,629,911, dated March 3, 1953, Serial No. 772,245, September 5, 1947. Application for reissue December 10, 1953, Serial No. 397,505

11 Claims. (Cl. 24—205.13)

Matter enclosed in heavy brackets [ ] appears in the original patent but forms no part of this reissue specification; matter printed in italics indicates the additions made by reissue.

This invention relates to closures of the slide fastener type. More particularly the invention relates to improved interlocking strips for slide fasteners.

Slide fasteners of the more common types comprise opposed chains of scoops that may be brought into interlocking relation to each other by the movement of a slider thereover which, as it passes over the respective chains, effects an angular movement of each scoop so that it can be brought into interlocking relation to the opposed likewise tilted scoop.

The manufacture and assembling of the scoops of the ordinary slide fastener into chains and the provision of means for attaching the chains to the material at the edges of an opening which is to be closed require a considerable manufacturing effort, which is reflected in the cost of such slide fasteners. For many purposes for which slide fasteners are used, a simpler and less expensive construction, requiring considerably less manufacturing effort, would have advantage. One of the objects of the present invention, therefore, is to provide a simple and improved slide fastener which not only can be used for many of the purposes for which the more complicated slide fasteners of the prior art are now used, but which in addition, can be used for purposes for which the slide fasteners of the prior art are not well adapted.

Another object of the invention is to provide a simple yet satisfactory means for fastening flexible sheet materials and the like in face-to-face or edge-to-face relation as well as in edge-to-edge relation.

Another object of the invention is to make slide fasteners by the rapid and inexpensive method of stamping from sheet materials.

The invention aims to provide an improved slide fasteners in which each fastener strip is formed as an integral structure, together with one of the sheet materials which are to be fastened together or with a marginal portion or portions by means of which it is to be attached to the sheet material. An important feature of the invention is the formation of such a fastener strip from a tough sheet material which is sufficiently flexible to endure without fracture the flexing movements required for interlocking said strip with and unlocking it from a like strip throughout the required life of the fastener and at the same time is of such inherent structural strength as to maintain the structural relations and the holding ability of interlocking fingers or "rungs" or the like stamped out from or integrally formed on the sheet material. Another important feature of most forms of the invention consists in so stamping, molding or otherwise forming the rungs with portions bulged toward one another that flexing of the strip will move said bulges apart like the opening of flexed jaws. By thus constructing the strips so that their flexing movements, required for the opening and closing of the slide fastener, take place for the most part in directions transverse to the planes of the marginal stretcher portions, to which the hump portions are integrally connected at uniformly spaced intervals, as will be seen, the range of materials and the gages thereof adapted for use with the invention are broadened as compared with ordinary slide fasteners. The advantages of this will be apparent from the following.

It will be seen that an important feature of the invention is its adaptability to production by quickly and easily performed and relatively inexpensive manufacturing operations. As hereinafter incidentally brought out, the interlock strips of the present invention can be easily and quickly produced on rotary or reciprocating blanking and stamping machines, e. g., by forming press rolls which first cut the blank and then form the strip into its finished shape in not more than two operations.

Other objects, important features and advantages of the invention, to which specific reference has not hereinabove been made, will appear hereinafter when the following description and claims are considered in connection with the accompanying drawings.

In this specification and the accompanying drawings I have shown and described a preferred embodiment of my invention and suggested various modifications thereof; but it is to be understood that these are not intended to be exhaustive nor limiting of the invention, but, on the contrary, are given for purposes of illustration in order that others skilled in the art may fully understand the invention and the principles thereof and the manner of applying it in various forms, each as may be best suited to the conditions of a particular use.

In the drawings:

Figure 12 is a sectional view of the completed fastener strip made from the blank shown in Figure 11, for face-to-face engagement, with the marginal edges thereof attached to one edge of a fabric to be fastened;

Figure 13 is a view of two interlock strips such as shown in Figure 12, showing the bringing of the two strips into or out of interlocking relation to each other;

Figure 14 is a side elevation of the strip shown in Figures 12 and 13;

Figure 15 is a section similar to Figure 5 showing the strips after they are interlocked;

Figure 16 is a section similar to Figure 4 through the slide showing the interlock strips just before interlocking;

Figure 17 shows still another modified interlock strip construction in which the attaching margins are provided with down-turned points adapted to be crimped over or clinched on the opposite face of the material to which the strips are to be connected, Figure 17 being a plan view of such a strip;

Figure 18 is a section on line 18—18 of Figure 17;

Figure 19 is a side elevation of the strip portion shown in Figure 17;

Figure 20 shows mechanical means for crimping the attaching means into attaching relation to the material to which the strip of Figures 17 to 19 is to be attached;

Figure 21:
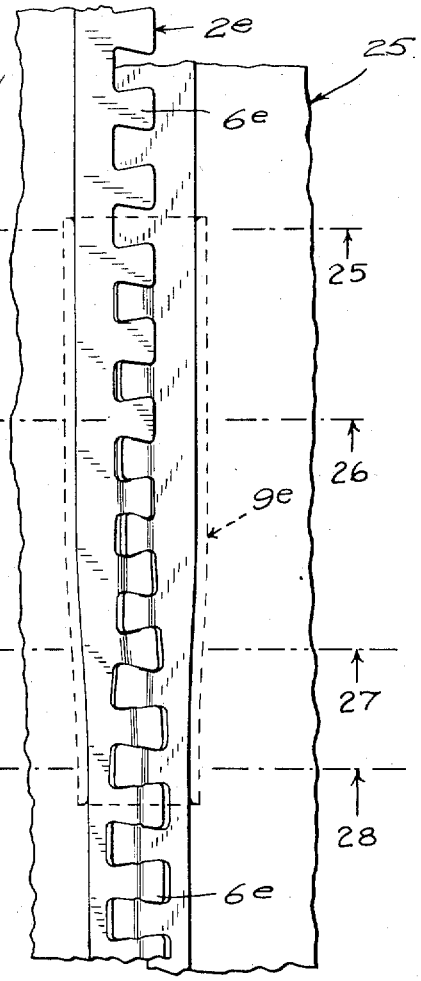
Figure 21 is a plan view of two strips in process of interlocking but with the slider cut away.
Figure 22:
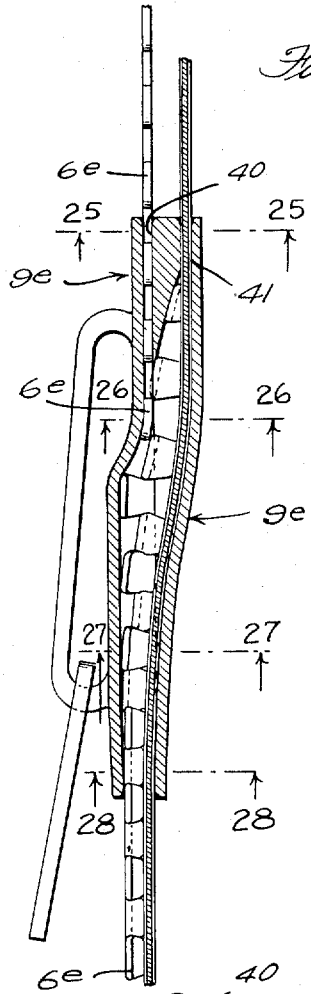
Figure 23:
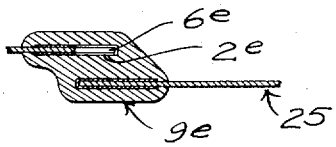
Figure 25:
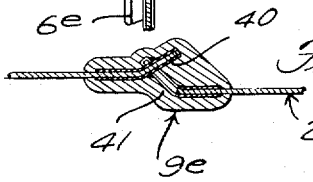
Figure 24:
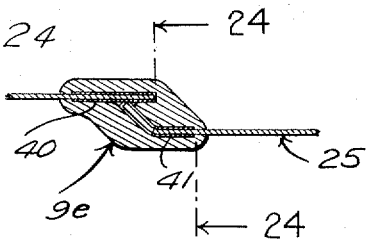
Figure 26:
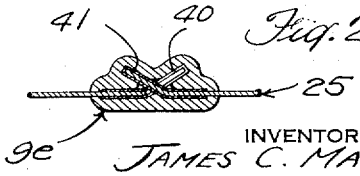

Figure 22 is a view taken on line 22—22 of Figure 24 showing one strip in edge view, the other strip sectioned, and with the slider shown in section but with its guide portion between the interengaging fingers broken away to expose said fingers; and Figures 23–26 are successive sections through the slider taken at lines 23—23, 24—24, 25—25, and 26—26 respectively, of Figures 21 and 22.

The strips of my present invention are of a tough, stiffly flexible material; tough in that it is not easily stretched and withstands repeated flexing without fracture; and stiff so that interlocking rungs of the material hold without collapse; and flexible to provide for separating the edges of the opening on which the fastener is used, and for the bending incident to interlocking and releasing the strips. I have found that materials suitable for the aforementioned purposes include both many of the metals and alloys thereof and many of the plastics, particularly those plastics that do not tend to become brittle with age. Especially suitable are cross-laminated stretched plastic film, fiber-reinforced plastics, advantageously with stretch-resistant fibers running both longitudinally to the stretchers and longitudinally of the rungs, respectively, and plastic-impregnated felts, papers and textiles. When, therefore, reference is made to the sheet material from which the interlocking strips are formed, it will be understood that the expression includes both sheet metal, including metal alloys, and sheet plastic, including stiffened paper, felt and textile.

This ability to use stiffened paper, felt or cloth is a very important consequence of my invention, in that it makes possible an integral fastening for the edges of clothing, sacks, boxes, etc., by merely coating or impregnating with a stiffening material, and then cutting and/or forming as hereinafter set forth.

In the form of the invention shown in Figures 1 to 5 inclusive, the strip is intended to be attached at one margin thereof to the edges or other parts which are to be fastened thereby. The strip is designed to be flexed transversely to the plane of its marginal stretcher portions.

A strip 2 of metal or plastic is first cut with the parenthesis-like pairs of slits *4*, the successive pairs of slits beig so spaced that outwardly bulged, *that is, convexly curved opposite* edges [of] *defining* parts 6 are spaced apart *at their greatest width* a distance less than [their] *said* width, whereas the narrower areas *with concave opposite edges* on either side thereof are spaced *apart at their greatest width*, a distance about equal to [their] *said* width. The *parts, as* rungs 6 having the [bulged] *convex* edges, are [humped up] *displaced outwardly in one direction* from the plane of the strip 2, with or without heating or a curing treatment; and the intermediate parts 8 having the concave edges are [depressed] *displaced outwardly in the opposite direction* from the plane of the strip 2.

Figure 4:
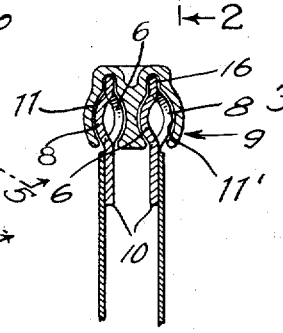
Figure 4 is a sectional view through two fastener strips and the slider taken on line 4—4 of Figure 3.
Figure 5:
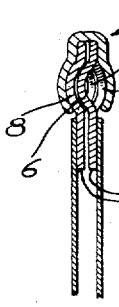
Figure 5 is a similar view in cross section taken on line 5—5 of Figure 3.

When the strip thus formed is bent [transverse] *transversely* to its plane and away from the parts or rungs 6, the gaps between the rungs 6 will enlarge sufficiently to permit the convex edges of *corresponding rungs of* a like strip, similarly bent, to enter between and pass beneath the convex edges of the rungs 6 of the first mentioned strip, as partly shown in Figures 4 and 5, and somewhat more graphically, in a modified form of the invention, in Figures 12 and 13.

Figure 1:
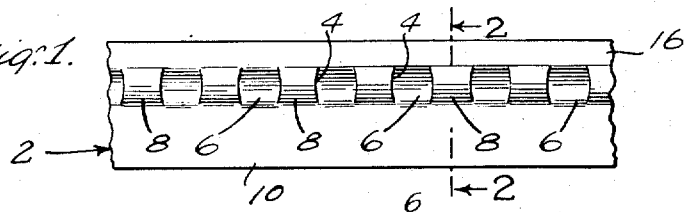
Figure 1 is a plan view of one embodiment of the fastener strip of the present invention.
Figure 2:
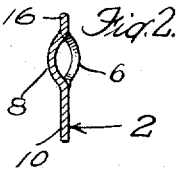
Figure 2 is a section through the material taken on line 2—2 of Figure 1.
Figure 3:
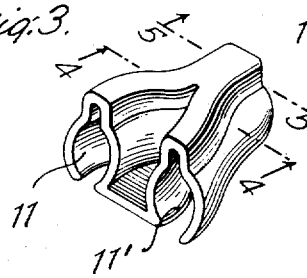
Figure 3 is a perspective view of a slider suitable for use in effecting the interlocking and unlocking movements of two of the fastener strips of Figures 1 and 2.

As shown more particularly in Figures 1, 2, and 5 the fastener strip just described is provided with a relatively wide attaching margin 10 for attachment to a side of the material which is to be closed or fastened, the other margin 16 being left comparatively narrow so that it does not project much beyond the closure. As shown in Figure 4, the narrow margin 16 of the interlock strip may also be used to facilitate guiding of the strip in the slider 9 into interlocking relation to a like strip.

Because of the appearance of this strip, I refer to the margins 10 and 16 as "stretchers" and the cross members 6 as the "rungs" by analogy to a ladder.

In the form of the invention shown in Figures 6 to 9 inclusive, the strip 2a, instead of being merely slit with parenthesis-like cuts 4, has the material in the areas 8, Figure 1, removed entirely by the stamping operation to form openings 18a. As will be seen from an examination of Figures 7, 8, and 9, the interlocked strips, which are otherwise like the strips shown in Figures 1 to 5 inclusive, have an overall thickness somewhat less than that of the strip shown in Figures 1 to 5, and therefore make a thinner or narrower closure. More important, the bending stress tends to distribute itself more uniformly along the stretched portions 10a and 16a; and as shown, this is further assured by making the openings 18a dumbbell-shaped so that the rungs 6 merge gradually into the stretchers 10a and 16a; and by gradually thickening the stretchers in the narrowing stretcher portions 17a and 19a and adjacent the openings 18a.

Figure 8:
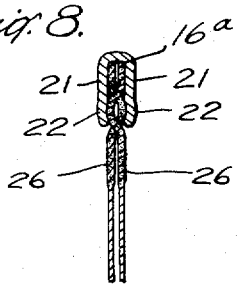
Figure 8 is a sectional view similar to Figure 5 but showing the modified strips similar to that shown in Figures 6 and 7 in the guideways of a modified slider.
Figure 9:
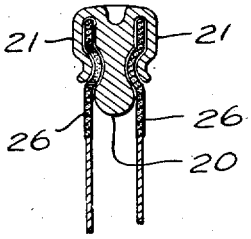
Figure 9 is a section through a part of the slider near its mouth, where the guideways are still spaced apart.
Figure 10:
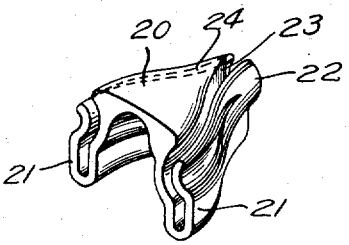
Figure 10 is an inverted isometric view of the slider shown in section in Figures 8 and 9.
Figure 11:
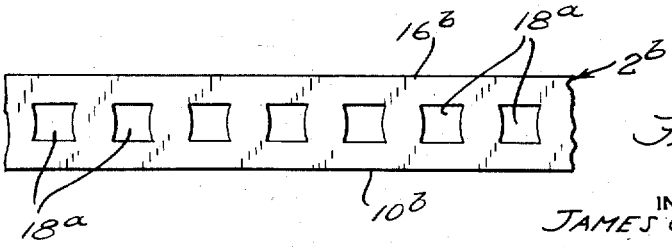
Figure 11 is a plan view of a strip blank for still another form of interlock strip.

The slider shown in Figures 8 and 9 and shown inverted in Figure 10 is best made as a die casting, although it may also be molded of plastic. Similar sliders adapted to serve this purpose may also be made as sheet metal stampings or molded plastic sheet, as is well understood in this art. In Figures 4 and 5 channels 11 and 11' are formed in the slider body with a cross-sectional form fitted to that of the fastener strip and a longitudinal curvature or angular relation to each other adapted to bring the two fastener strips together while bent on a radius such that the laterally bulged edges of rungs 6 are opened like jaws wide enough to receive between them a rung 6 of an interlocking counterpart strip. As the two strips emerge together from the small end of the slider, they are interlocked as shown in Figures 5 and 8, and serve to hold each other in parallelism, so that they cannot come apart, but within the slider, where the strips are bent to diverging curves or angles the "jaws" are opened and the strips readily separate.

The overhang of the rungs when the strips are interlocked—i. e. the maximum excess of width of the rung over the corresponding width of the space between the rungs of a cooperating strip—must of course be greater than the maximum stretch of the stretchers in the length of one space 8 during normal use and less than the retraction of such bulged portion from the next one in the strip due to bending of the strips in the slider.

As shown in Figures 8–10 inclusive, the central part 20 of the slider is integral with the sides 21 which converge toward the narrow end. A tapered portion 23, best shown in Figure 10, begins just behind the mouth of the slider and extends backward at uniform spacing from the sides 21 so as to permit passage of the fastener strips as shown in Figure 9. At the smaller end, near the end of the tapered portion 23, the curvature of the sides 21 is reversed at 22 so that it bulges outward, whereas at the wider end the curvature is inward.

Figure 6:
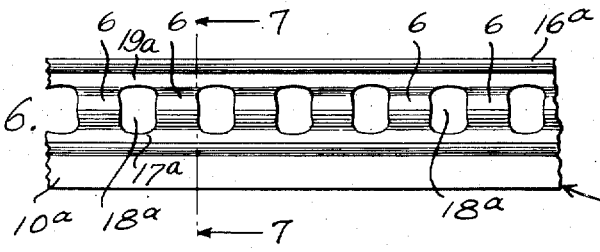
Figure 6 is a plan view of a modified form of strip.
Figure 7:
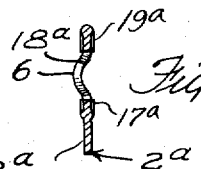
Figure 7 is a view in vertical section taken on line 7—7 of Figure 6.

Figures 8 and 9 show the fastener made as an integral part of a kraft paper bag 25. The upper edge portions 26 are impregnated and coated with a stiff flexible plastic such as a vinyl chloride-vinyl acetate copolymer; and these edge portions are then punched and formed as shown in Figures 6 and 7 and fitted with a slider as shown in Figures 8–10. Very little is thus added to the cost of the bag, but it is now made into a fully enclosable package. Tin cans and other flexible sheet metal or plastic boxes and other containers may use a like closure without the necessity for plastic stiffening.

In the form of the invention shown in Figures 11 to 16 inclusive, the stretcher portions, instead of being left in the plane of the original sheet material as in the forms of the invention shown in Figures 1 to 9 inclusive, are brought together, after the rungs 6 are formed. The material constituting the side or edge of the opening to be closed is firmly attached between these stretcher porions, e. g. by cementing, heat sealing, or stitching through the material. In this form of the invention the two margins 10c and 16c are preferably of the same width so that when bent into the shape shown in section in Figure 12, their edges are substantially flush with each other.

To permit overlapping edges such as are commonly used with buttons, hooks, snap fasteners, etc., I find it more desirable in most cases to use uneven margins so that the rungs come on the side of the fold or humped portion. This is shown in Figures 13 to 16.

It will be seen that in the form of the invention shown in Figures 13 to 16 inclusive, one margin 10c of the original blank strip is sufficiently wider than the other margin 16c so that the rungs 6c of this form of the invention may project laterally from the planes of the two margins 10c and 16c in such manner that the flexing of the fastener strip will take place transversely to these planes and the interlocking will be a face interlock as shown more clearly in Figures 13 and 16. Instead of forming from flat strip with edge portions brought together, extruded tubes may be used, with the rungs cut out, e. g., by flattening the tube and punching, or by punching against a matching female die or anvil, which may be secured to the mandrel of an extruding machine.

In the modified form of the invention shown in Figures 17 to 20 inclusive, the strip there shown has its rungs 6d arranged for face interlocking with a like strip and the outer edges of the margins 10d and 16d of this strip, which are preferably of equal width, have teeth 32 formed thereon in the blanking operation. These teeth 32 are turned down at right angles to the margins 28 and 30 in the stamping operation so that when it is desired to attach this interlock strip to the material forming the side or edge of an opening to be closed, such for example, as a fabric, the points 32 may be forced through the material and clinched against the other face thereof as shown more particularly in Figure 20. This fastening operation may readily be performed on any suitable machine having, for example, crimping and clinching rollers or jaws 34 and 36.

In Figures 21 to 26 is shown another embodiment of my invention wherein the rungs are formed at the edge of the strip and the strip is integral with the material to be fastened.

In this case a package 25 of heavy kraft paper with the edges impregnated as already described in connection with Figures 8 and 9, has tape 2e, e. g., of glass cloth impregnated and cemented to the paper by a polyvinyl butyryl plastic. The edge of the tape is woven with projections as shown which form the rungs 6e. The edges of the paper are similarly cut out either before or after the tape is cemented thereon.

Opposite edges at the mouth of the package are similarly formed with such rungs, each rung 6e being a little wider than the space between the rungs on the opposite edge where it is engaged. By means of a slider 9e these edges are first bent away from one another, laterally. Then the rungs of one are bent up toward the spaces of the other end at the same time the sheets are brought closer together. Since the rungs are too wide to slip easily into the spaces, the first effect of this is to push up the rungs on the opposed edge and this effect is aided by a guide groove 40 in the slider. Because of the sharp incline in the grooves 40 and 41 where the slider moves the edges one at a time into engagement, each finger at the top tends to be skewed so that the lower finger can readily pass into the adjacent space. At the edges are then brought together and parallel the finger is squeezed and held securely. The several stages of this closing are shown in Figures 23–26.

In the example illustrated in Figures 22–26, the rungs 6e need not be undercut or originally provided with bulges, but are made slightly wider than the spaces so that along the line of engagement the rungs are under edgewise compression such that portions of the rungs beyond said line of engagement actually do bulge and interlock against any direct pull.

From the foregoing description it will be seen that the fastener strips of the present invention can be manufactured quickly and easily in continuous lengths by machinery of comparatively simple design, the only manufacturing steps required being an initial blanking cut and/or molding operation to form the humped rungs on a higher level and to depress or remove the areas between; the rungs being laterally bulged to provide the projections which interlock with the counterpart strip. All of this can be done with rotary dies and/or punches. It will further be seen that in forming the fastener strips as integral structures no separate assembling operations are necessary.

The design of the fastener strip is such that the slider 9 can be caused to slide over the interlock strips in either direction for its opening and closing movements, it being only necessary to reverse the slide when assembling to make it equally effective for reverse opening and closing movements.

As hereinabove suggested, the fastener strips of the present invention are particularly adapted for use where extreme flexibility is not required of a slide fastener. It will be seen, however, that these fasteners have important advantage over some forms of slide fasteners in that they may be used between two faces which it is desired to connect together, whether at the edge or centrally located, not by an edgewise connection, but by a face-to-face connection. If the connection is to be of an edge to the central portion of the sheet, the humps formed on the central portion, whether integral or an applied strip, must be of such bulbous form, i. e., so undercut, that the slider can engage them without the necessity for engaging the opposite side of the sheet. This is, of course, entirely feasible.

It is also an advantage of the invention that it lends itself readily to corner engagements, i. e., having the engaged sheets at any desired angle. Thus, a base engaging strip, such as that shown in Figures 1, 6, 14, etc., may be mated with an edge engaging strip, or the strips shown in Figures 23–28 may be engaged with the sheets at any desired angle. Thus the invention lends itself readily to opening a container, box, etc. at the corners thereof, as well as by bringing the upper edges together in face to face engagement.

Although I refer to the fastener strips in this application as though the spacing between the rungs were always uniform and the width of the rungs likewise uniform, this is because that is the most economical and satisfactory way of making them; various alternatives may be substituted as equivalents for most purposes. Thus alternate spaces and rungs may be larger than intermediate ones or their sizes may vary in any desired sequence; and the counterpart strips may have different sized rungs, respectively, provided only that the rungs of one fit the spaces of the other.

Likewise, although I have referred to rungs formed by cutting from sheet material, since that is the most economical and satisfactory for most purposes, they may be molded with or without openings by rolling or reciprocating molds with continuous or step-by-step feed of plastic material or extrusion or injection between said molds.

I claim:

1. A sinuous, tape-like slide fastener strip which comprises a tough flexible sheet substantially planar except for a line of projecting humps along one face, each hump being bulged toward the next above the level of the surface of said sheet and undercut from said bulge, the bulged portions of said humps being substantially wider than the spaces between them and portions on each side thereof being at most substantially equal in width to the spaces between the corresponding facing portions of adjacent humps.

2. A slide fastener as defined in claim 1 wherein the ends of said humped portions are undercut and lie on parallel lines whereby a slider may engage said humps and guide and pull them into interengagement without embracing the adjacent sheet.

3. A slide fastener which includes a pair of strips of a tough, stiffly flexible material; each strip comprising an integrally continuous unbroken longitudinal stretcher and transverse rungs integral with the stretcher extending from one side thereof for engagement with like rungs of the other strip outwardly beyond one face of the strip and spaced from one another; the width of the rungs along a line of engagement near the stretcher being at least equal to the spacing between them along the same line of engagement, and any excess of said width over said spacing being within the limit of elastic, widthwise compression of said rungs; said rungs, in another zone farther from the stretcher, being wider than the spacing between the rungs, measured on the same zonal line, when the strip is unbent, but less than the widest open spacing between the rungs when the strip is flexed to an arc within its elastic limit about an axis parallel to said face of the strip; said stretchers being spaced with their faces substantially parallel and close to a common plane and the rungs extending between them being humped up from a straight line between the stretcher.

4. A slide fastener which comprises a pair of strips of a tough, stiffly flexible material, each strip comprising a continuous unbroken longitudinal stretcher and transverse rungs integral with the stretcher extending from one side thereof for engagement with like rungs of the other strip, the rungs of one strip extending outwardly beyond one face of the one strip but not outwardly beyond the other face thereof and the rungs being spaced from one another, the individual width of the rungs along a line of engagement near the stretcher being at least equal to the individual spacing between them along the same line of engagement and any excess of said width over said spacing being within the limit of elastic, widthwise compression of the rungs, the rungs in another zone further from said stretcher being not narrower than the spacing between the rungs measured on the same line when the strip is unbent but narrower than the widest open spacing between the rungs when the strip is flexed to an arc within its elastic limit about an axis parallel to said one face of the strip, said stretchers when the strips are interengaged defining a pair of closely spaced substantially parallel planes, and the portions of said strips embodying said rungs being in overlapping interengaged relationship.

5. A slide fastener as defined in claim 4 in which at least one of said strips is an integral edge portion of a flexible sheet material container.

6. A slide fastener as defined in claim 4 in which at least one of said strips is an integral edge portion of a sheet metal container.

7. A slide fastener as defined in claim 4 in which at least one of said strips is an integral edge portion of a sheet plastic container.

8. A slide fastener as defined in claim 4 in which at least one of said strips is an integral edge portion of a paper container and said edge portion is impregnated and stiffened with a flexible plastic.

9. A slide fastener as defined in claim 4 in which at least one of said strips is an integral edge portion of a cloth container and said edge portion is impregnated and stiffened with a flexible plastic.

10. A slide fastener as defined in claim 4 in which at least one of said strips comprises a tough flexible sheet material with one edge thereof looped back and the looped portion being cut away on one side to form said rungs and spaces, the opposite side being substantially flat.

11. A slide fastener as defined in claim 4 in which each of said strips is an integral edge portion of a paper container, each said edge portion being impregnated and stiffened with a flexible plastic and looped back on itself, the looped portion being cut away on one side to form said rungs and spaces, the opposite side being substantially flat.

No references cited.